United States Patent Office 3,849,524
Patented Nov. 19, 1974

3,849,524
O-ETHYL-O-(3-METHYL - 4 - METHYLMERCAPTO-PHENYL)PHOSPHORIC ACID DIESTER CHLORIDE
Reimer Colln, Wuppertal-Elberfeld, and Wolfgang Hofer, Fritz Maurer, and Lothar Rohe, Wuppertal, Germany, assignors to Bayer Aktiengesellschaft, Leverkusen, Germany
No Drawing. Filed Oct. 18, 1972, Ser. No. 298,728
Claims priority, application Germany, Oct. 28, 1971, P 21 53 793.9
Int. Cl. C07f 9/14
U.S. Cl. 260—949  1 Claim

ABSTRACT OF THE DISCLOSURE

The new compound O - ethyl - O - (3-methyl-4-methylmercaptophenyl)-phosphoric acid diester chloride of the formula

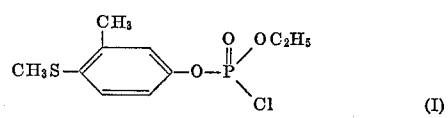

is prepared by contacting O-ethyl-phosphoric acid ester dichloride and 3-methyl - 4 - methylmercaptophenol in the presence of concentrated alkali. The new compound can be racted with isopropylamine to produce O-ethyl-O-(3 - methyl - 4 - methylmercaptophenyl) - N - isopropyl-phosphoric acid diester amide which is a known nematocide.

---

The present invention relates to the new compound, O - ethyl - O - (3-methyl-4-methylmercaptophenyl)-phosphoric acid diester chloride, to a process for its preparation and to its use as an intermediate for the synthesis of pesticidal substances, especially for the synthesis of O-ethyl - O - (3 - methyl-4-methylmercaptophenyl)-N-isopropyl-phosphoric acid diester amide.

It is known from German Patent DAS 1,121,882 that O - ethyl - O - (3 - methyl-4-methylmercaptophenyl) - N-isopropyl-phosphoric acid diester amide, which is a highly active nematocide (see Am. Phytopath. Soc., Vol. 26, pages 152–173 and Mitt. der biologischen Bundesanstalt für Land- und Forstwirtschaft, Berlin-Dahlem 1969, Issue 136, page 77), can be prepared from O-(3-methyl-4-methylmercaptophenyl)-phosphoric acid ester dichloride, ethanol and isopropylamine.

In this process, the difficulty arises that O - (3-methyl-4-methylmercaptophenyl)-phosphoric acid ester dichloride can only be obtained by reaction of a large excess e.g. up to 5 molar, of phosphorus oxychloride with 3-methyl-4-methylmercaptophenol. According to U.S. Pat. No. 3,153,081 and British Patent No. 644,467, this excess of phosphorus oxychloride is absolutely essential in order to suppress the formation of the diphenyl ester and thus to obtain the desired material in good yield.

The present invention provides, as a new compound, O - ethyl - O - (3-methyl-4-methylmercaptophenyl)-phosphoric acid diester chloride, which has the formula

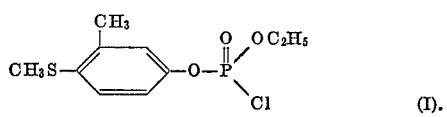

The present invention also provides a process for the preparation of O - ethyl - O - (3-methyl-4-methylmercaptophenyl)-phosphoric acid diester chloride, in which O-ethyl-phosphoric acid ester dichloride, which has the formula

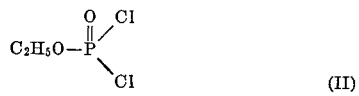

is reacted with 3-methyl-4-methylmercaptophenol, which has the formula

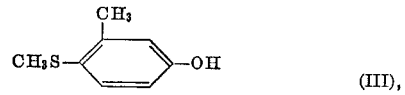

in the presence of an alkaline acid-binding agent.

Surprisingly, the O - ethyl - O - (3-methyl-4-methylmercaptophenyl)-phosphoric acid diester chloride is distinctly resistant to hydrolysis in a two-phase system and can, even in the presence of aqueous bases, be reacted quantitatively with isopropylamine to give the known compound O - ethyl - O - (3-methyl-4-methylmercaptophenyl)-N-isopropyl-phosphoric acid diester amide. Furthermore, it is to be emphasized that the O-ethyl-phosphoric acid ester dichloride (II) required as the starting material is obtained in very good yields and a high degree of purity from approximately equivalent amounts of ethanol and phosphorus oxychloride. This is an important advangtage over the known, and fundamentally suitable, process for the preparation of O-ethyl-O-(3-methyl-4-methylmercaptophenyl) - N - isopropyl - phosphoric acid diester amide that has already been mentioned. Since, in addition to the synthesis of new active compounds in the field of pesticides, it is of equally great economic importance to discover new intermediates, which can easily be prepared industrially, for the synthesis of active compounds that are already known and proven, the compound according to the invention represents a genuine enrichment of the art.

The course of the reaction can be represented by the following equation:

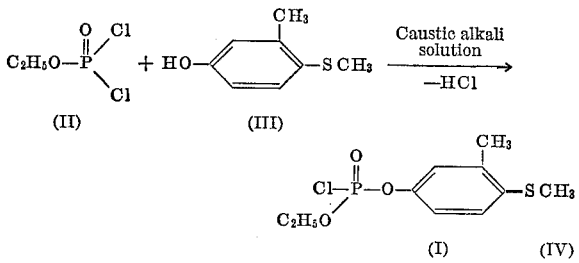

The starting materials of the formulas (II) and (III) are known compounds and can both be prepared easily, even on an industrial scale. The process is preferably carried out in the presence of a suitable solvent. Practically any inert organic solvent can be used for this purpose, especially an aromatic hydrocarbon such as benzene, xylene or toluene, an ether such as diethyl ether, dibutyl ether or dioxane, a ketone such as acetone, methyl ethyl ketone, methyl isopropyl ketone or methyl isobutyl ketone, or a nitrile such as acetonitrile or propionitrile. A concentrated aqueous caustic alkali preferably sodium and potassium, solution is preferably used as the acid acceptor. 40–50% strength aqueous sodium hydroxide solution has proved particularly suitable.

The reaction temperature can be varied over a fairly wide range. In general, the process is carried out at about −10 to +40° C., preferably at about −10° to +25° C. The reaction is generally carried out at normal pressure.

In a preferred embodiment of the process, the 3-methyl-4-mehtylmercapto-phenol is mixed in one of the above-indicated solvents together with the O-ethyl-phosphoric acid ester dichloride, (the latter advantageously being employed in a molar excess of 5% to 30%) and the caustic alkali solution is added dropwise at the above-indicated temperatures. After further reaction for one hour, ice-cold water is added and concentrated sodium hydroxide solution is introduced dropwise. After stirring for a further hour, the mixture can be worked up in the usual manner and the product can be isolated. If the O-ethyl - O - (3 - methyl-4-methylmercaptophenyl)-phosphoric acid diester chloride is to be used immediately, an interim isolation is not necessary, and instead of reaction soluton can be further reacted directly.

As has already been mentioned, the O-ethyl-O-(3-methyl - 4 - methylmercaptophenyl)-phosphoric acid diester chloride can be used as an intermediate for the synthesis of O - ethyl - O - (3-methyl-4-methylmercaptophenyl) - N - isopropyl-phosphoric acid diester amide, which is known as a nematocide.

The process of this invention is illustrated in and by the following preparative Example.

Example

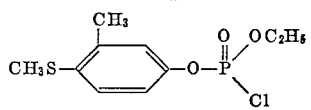

(I)

(a) A solution of 21.0 g. of sodium hydroxide is 25.6 g. of water is added dropwise over the course of 30–40 minutes to a stirred mixture of 100 g. (0.6 mole) of O - ethyl-phosphoric acid ester dichloride, 400 ml. of toluene and 77.2 g. (0.5 mole) of 3-methyl-4-methyl-mercapto-phenol at $-10°$ to $-5°$ C. After continuing the reaction for one hour at 0° C., 120 g. of ice-cold water are added and subsequently 0.41 mole of a concentrated sodium hydroxide solution is introduced dropwise at about 5° C. The mixture is stirred for one hour at 20° to 25° C. (in order to remove excess O-ethyl-phosphoric acid ester dichloride that has been employed) and the phases are then separated.

(b) The organic phase obtained in (a) is shaken with 200 g. of ice-water, dried with sodium sulfate and freed of the solvent under reduced pressure. The residue is left at 70° C./2 mm. Hg for about 30 minutes and in this way 131.7 g. (93.8% of theory) of O-ethyl-O-(3-methyl-4-methylmercaptophenyl)-phosphoric acid diester chloride with a refractive index, $n_D^{23}$, of 1.5438 are obtained.

(c) Alternatively, to the organic phase obtained in (a) there may be added dropwise with stirring 0.5 mole of isopropylamine to produce directly O-ethyl-O-(3-methyl-4-methylmercaptophenyl)-N-isopropyl-phosphoric acid diester amide.

It will be appreciated that the instant specification and examples are set forth by way of illustration and not limitation and that various modifications and changes may be made without departing from the spirit and scope of the present invention.

What is claimed is:

1. O - ethyl - O -(3-methyl-4-methylmercaptophenyl)-phosphoric acid diester chloride of the formula

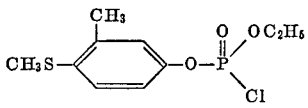

References Cited
UNITED STATES PATENTS

| | | | |
|---|---|---|---|
| 2,863,903 | 12/1958 | Toy et al. | 260—973 X |
| 2,978,479 | 4/1961 | Kayser et al. | 260—949 |
| 3,711,582 | 1/1973 | Schrader et al. | 260—973 X |
| 3,652,740 | 3/1972 | Schrader et al. | 260—949 |

LORRAINE A. WEINBERGER, Primary Examiner

R. L. RAYMOND, Assistant Examiner

U.S. Cl. X.R.

260—973, 984